Aug. 15, 1944.  A. C. SAMPIETRO ET AL  2,356,093

CUSHION, SHOCK ABSORBER, VIBRATION DAMPER, OR THE LIKE

Filed Jan. 20, 1943

Inventors
A. C. Sampietro
W. T. Oliver
By Glascock Downing Seebold Attys

Patented Aug. 15, 1944

2,356,093

UNITED STATES PATENT OFFICE 2,356,093

CUSHION, SHOCK ABSORBER, VIBRATION DAMPER, OR THE LIKE

Achilles Charles Sampietro, Coventry, and Wilfred Thomas Oliver, Leamington, England, assignors to Humber Limited, Coventry, England Application January 20, 1943, Serial No. 473,016
In Great Britain July 22, 1942

3 Claims. (Cl. 267—64)

In connection with various forms of machinery it is at the present time usual to employ rubber blocks to serve as cushions, shock absorbers, or vibration dampers. The present shortage of rubber necessitates some alternative and equivalent means which will obviate the use of rubber, and the object of the present invention is to enable this condition to be met in a satisfactory manner.

In the accompanying sheet of explanatory drawings.

Figure 1:
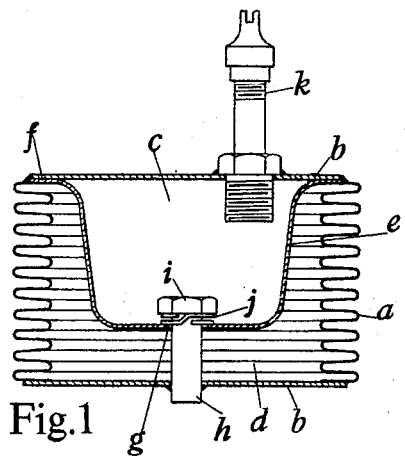
Figure 1 is a sectional elevation of a device constructed in accordance with the invention.

In carrying the invention into effect as shown in Figure 1, we employ a hollow cylindrical body $a$ which is made from corrugated metal so that it is capable of axial extension and contraction, and which is intended to be used with its axis vertical or nearly so, the ends of the body being closed by strong plates $b$ which may be provided with any convenient means (not shown) for securing the device in the required position. The interior of the body $a$ is divided into two compartments $c$, $d$ by a strong cup-shaped metal member $e$ having a flange $f$ around its open end, this flange being welded or otherwise secured in a fluid-tight manner between the upper end of the body and the corresponding end plate $b$. The base of the cup-shaped member $e$ is formed with a central hole $g$, and through this hole passes a vertical stem $h$ which at its lower end extends through and is welded or otherwise secured in a fluid-tight manner to the lower end plate $b$. The upper end of the stem $h$ is formed with a head $i$ which is adapted to bear through the medium of a spring washer $j$ on the base of the cup-shaped member $e$, so that the stem serves to limit the extensibility of the body $a$. The hole $g$ is of sufficiently larger diameter than the stem $h$ to provide a restricted passage between the two compartments $c$, $d$.

Into the interior of the body $a$ is introduced in any convenient manner a quantity of liquid (preferably oil) sufficient to submerge the base of the cup-shaped member $e$, and the region above the liquid in the compartment $c$ is charged with air or other gas under pressure through a valve $k$ carried by the upper end plate $b$.

The device above described has elastic properties closely resembling those of rubber, and may serve as a cushion for supporting a vehicle engine on its frame, for damping spring vibrations, for absorbing road wheel shocks, or for a variety of analogous purposes.

Figure 2:
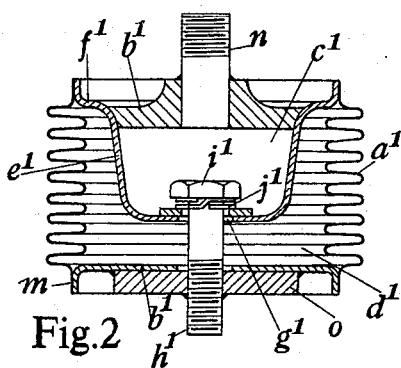
Figure 2 is a view similar to Figure 1 illustrating another form of the invention.

The example shown in Figure 2 is suitable when it is desired to make the body $a$ from stainless steel, the parts similar or analogous to those above described being indicated by the same reference characters as those employed in Figure 1 but suffixed by 1. In this example the outer edges of the flange $f^1$ on the cup-shaped member $e^1$ and the lower end plate $b^1$ are formed with lips $m$ to which the adjacent ends of the body $a^1$ are secured. Also the upper end plate $b^1$ closes the upper end of the cup-shaped member $e^1$, and carries a screw $n$, the latter serving with a screw-threaded extension of the lower end of the stem $h^1$ to secure the device in the required position. The screw $n$ may be hollow and may serve to carry a valve through which the air or other gas is introduced into the compartment $c^1$. Further the lower end plate $b$ has secured to its outer side a reinforcing plate $o$.

In both of the examples above described the rate of contraction of the body is controlled by fluid flow between the compartments in the body. In other words the body is equivalent to a compression spring. But to make the body the equivalent of a tension spring the air or other gas in the body may in some cases be initially at atmospheric or lower pressure, this pressure being reduced when the body is extended.

The invention is not, however, limited to the examples above described as subordinate details may be varied to suit requirements.

Having thus described our invention what we claim as new and desire to secure by Letters Patent is:

1. A device adapted to serve as a cushion, shock absorber, vibration damper, or the like, and comprising in combination a contractible and extensible hollow cylindrical body consisting of corrugated metal and having closure plates at its ends, a cup-shaped member arranged within the body in rigid association with one of the said plates and serving to divide the interior of the body into two compartments, and a stem secured to the other of the said plates and extending through a hole in the cup-shaped member, the size of the hole being such as to provide around the stem a restricted passage through which the two compartments intercommunicate, and the said body being adapted to be occupied in part by oil or other liquid which can flow through the restricted passage when the body is contracted or extended.

2. A device as claimed in claim 1, in which the stem is provided at the end remote from its supporting plate with a head adapted to co-operate with the cup-shaped member for limiting extension of the body.

3. A device as claimed in claim 1 and having associated with it a valve whereby air or other gas under pressure can be introduced into the body.

ACHILLES CHARLES SAMPIETRO.
WILFRED THOMAS OLIVER.